United States Patent
Nagase

(10) Patent No.: US 8,169,168 B2
(45) Date of Patent: May 1, 2012

(54) ELECTRIC POWER STEERING APPARATUS

(75) Inventor: Shigeki Nagase, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 164 days.

(21) Appl. No.: 12/747,024

(22) PCT Filed: Nov. 20, 2008

(86) PCT No.: PCT/JP2008/071122
§ 371 (c)(1),
(2), (4) Date: Jun. 9, 2010

(87) PCT Pub. No.: WO2009/084341
PCT Pub. Date: Jul. 9, 2009

(65) Prior Publication Data
US 2010/0264857 A1    Oct. 21, 2010

(30) Foreign Application Priority Data

Dec. 27, 2007  (JP) .................................. 2007-337616

(51) Int. Cl.
*B62D 5/00* (2006.01)
*B62D 5/04* (2006.01)
*B62D 5/30* (2006.01)
*B62D 6/00* (2006.01)

(52) U.S. Cl. ............................ 318/139; 180/443; 701/41

(58) Field of Classification Search ............... 318/400.3, 318/139; 180/443, 446; 701/41, 43; 361/155, 361/156; 323/282; 327/143
See application file for complete search history.

(56) References Cited

U.S. PATENT DOCUMENTS

| 6,008,600 | A | 12/1999 | Tomioka |
| 6,727,669 | B2* | 4/2004 | Suzuki et al. ................. 318/139 |
| 7,589,940 | B2* | 9/2009 | Sawano et al. .................. 361/18 |
| 2003/0071587 | A1* | 4/2003 | Suzuki et al. ................. 318/139 |
| 2005/0168892 | A1* | 8/2005 | Kuroda et al. .................. 361/42 |

(Continued)

FOREIGN PATENT DOCUMENTS

JP    10 136687    5/1998

(Continued)

OTHER PUBLICATIONS

U.S. Appl. No. 12/681,972, filed Apr. 7, 2010, Nagase.

(Continued)

*Primary Examiner* — Eduardo Colon Santana
(74) *Attorney, Agent, or Firm* — Oblon, Spivak, McClelland, Maier & Neustadt, L.L.P.

(57) ABSTRACT

An electric power steering apparatus includes a charge-discharge circuit including a circuit charging an auxiliary power supply by turning on and off an MOS-FET for voltage boosting and that selectively configures a first output mode in which an electric power is supplied to a motor by a first electrical conduction path to which a voltage of a battery is applied or a second output mode in which the electric power is supplied to the motor by a second electrical conduction path to which a voltage of a source of the series-connected battery and auxiliary power supply is applied. When a failure of the battery is detected, the electric power steering apparatus connects the first conduction path to an electrical conduction path to ground by continuously holding the MOS-FET in an on-state and drives the charge-discharge circuit to select the second output mode, thereby configuring a circuit to supply the motor with the electric power only from the auxiliary power supply.

4 Claims, 2 Drawing Sheets

U.S. PATENT DOCUMENTS

| | | | |
|---|---|---|---|
| 2007/0000718 A1* | 1/2007 | Sawano et al. | 180/446 |
| 2007/0268048 A1* | 11/2007 | Komatsu et al. | 327/143 |
| 2010/0006360 A1* | 1/2010 | Kishimoto | 180/65.285 |
| 2010/0263960 A1* | 10/2010 | Nagase | 180/443 |
| 2011/0015828 A1* | 1/2011 | Shimizu | 701/43 |
| 2011/0127936 A1* | 6/2011 | Ogasawara | 318/400.3 |

FOREIGN PATENT DOCUMENTS

| | | | |
|---|---|---|---|
| JP | 2003 244943 | | 8/2003 |
| JP | 2003267247 A | * | 9/2003 |
| JP | 2003 320942 | | 11/2003 |
| JP | 2003319699 A | * | 11/2003 |
| JP | 2004 135389 | | 4/2004 |
| JP | 2005 261054 | | 9/2005 |
| JP | 2005 261180 | | 9/2005 |
| JP | 2006 213273 | | 8/2006 |
| JP | 2007 131075 | | 5/2007 |
| JP | 2007 166792 | | 6/2007 |
| JP | 2009040149 A | * | 2/2009 |
| WO | 2007 004357 | | 1/2007 |

OTHER PUBLICATIONS

U.S. Appl. No. 12/738,954, filed Apr. 20, 2010, Nagase.
U.S. Appl. No. 12/747,079, filed Jun. 9, 2010, Nagase.

* cited by examiner

ELECTRIC POWER STEERING APPARATUS

TECHNICAL FIELD

The present invention relates to an electric power steering apparatus that generates a steering assist force by an electric motor. More particularly, the present invention relates to a configuration of electric circuit of the electric power steering apparatus.

BACKGROUND ART

The electric power steering apparatus is a machine that operates the motor for generating the steering assist force according to a steering torque applied by a driver. In recent years, the demand for electric power steering apparatuses for large-size automobiles has increased rapidly. Such a large-size automobile requires an increased steering assist force so that a larger amount of electric power must be supplied to the motor. In some cases, however, a battery alone is unable to fully meet such a large power demand. In this connection, an arrangement has been proposed wherein an auxiliary power supply is provided in addition to the battery such that the normal power demand is met by the battery alone but when a larger amount of electric power is required, the electric power is supplied by both the battery and the auxiliary power supply connected in series (see, for example, Japanese Unexamined Patent Publication No. 2005-287222 (FIG. 1)).

If the battery fails, the electric power steering apparatus stops working, resulting in a manual operation of the steering apparatus. In order to offer enhanced reliability, therefore, it has also been proposed to equip the electric power steering apparatus with an emergency power source for supplying the electric power in place of the battery such that the steering assist force may not be suddenly lost at the time of battery failure (see, for example, Japanese Unexamined Patent Publication No. 2006-213273 (FIG. 1) and Japanese Unexamined Patent Publication No. 2003-320942 (FIG. 2 to FIG. 6)).

However, if the electric power steering apparatus is provided with the auxiliary power supply for meeting the high power demand and further with the emergency power source providing for the battery failure, the apparatus has the larger number of power sources, so that components for controlling the charge/discharge of these power sources are also increased. This results in complicated circuit configurations and thence, in increased manufacture costs.

DISCLOSURE OF THE INVENTION

In view of the above, an object of the present invention is to provide an electric power steering apparatus that is equipped with not only the function of auxiliary power supply capable of meeting the high power demand but also the function of emergency power source and minimizes the number of components.

In accordance with the present invention, an electric power steering apparatus for generating a steering assist force by a motor, comprises: (a) a battery for supplying an electric power to the motor; (b) an auxiliary power supply connected in series with the battery and capable of supplying an electric power to the motor; (c) a detector for detecting a failure of the battery; (d) a charge-discharge circuit including a charge circuit for charging the auxiliary power supply by turning on and off a voltage-boosting switching device interposed in an inductance circuit powered by the battery and selectively configuring a first output mode or a second output mode, the first output mode defining a state that the electric power is supplied to the motor by way of a first electrical conduction path through which a voltage of the battery is applied to an electrical conduction path to ground, the second output mode defining a state that the electric power is supplied to the motor by way of a second electrical conduction path through which a voltage of a source including the series-connected battery and auxiliary power supply is applied to the electrical conduction path to ground; and (e) a control circuit for driving the charge-discharge circuit to select either of the first output mode and the second output mode in response to a required steering assist force, the control circuit connecting the first electrical conduction path to the electrical conduction path to ground by continuously holding the switching device in an on-state at the time of detection of a failure of the battery by the detector, the control circuit also driving the charge-discharge circuit to select the second output mode to thereby supply the motor with the electric power only from the auxiliary power supply.

In the electric power steering apparatus arranged as described above, the high power from the source including the series-connected battery and auxiliary power supply can be supplied to the motor by driving the charge-discharge circuit to select the second output mode. When the failure of the battery is detected, the electric power only from the auxiliary power supply can be supplied to the motor by continuously holding the switching device of the charge circuit in the on-state so as to connect the first electrical conduction path to the electrical conduction path to ground and by driving the charge-discharge circuit to select the second output mode. Thus, the auxiliary power supply can be used not only for supplying the high power but also as the emergency power source. What is more, the switching device to permit the auxiliary power supply to be used as the emergency power source is a component of the circuit for charging the auxiliary power supply. Therefore, the function of emergency power source can be imparted to the auxiliary power supply without adding a circuit component. That is, it is possible to equip the electric power steering apparatus with not only the function of auxiliary power supply capable of meeting the high power demand but also the function of emergency power source and minimizes the number of components.

The above electric power steering apparatus may have an arrangement wherein an on-off controllable switch is interposed in a way from a terminal of the battery to the first electrical conduction path and wherein the control circuit opens the switch when the failure of the battery is detected.

In this case, the discharge of the battery is disabled by opening the switch so that the overdischarge of the failed battery can be avoided.

A switching device for chopper-boosting may be directly used as the switching device of the above power steering apparatus.

BEST MODE FOR CARRYING OUT THE INVENTION

Figure 1:
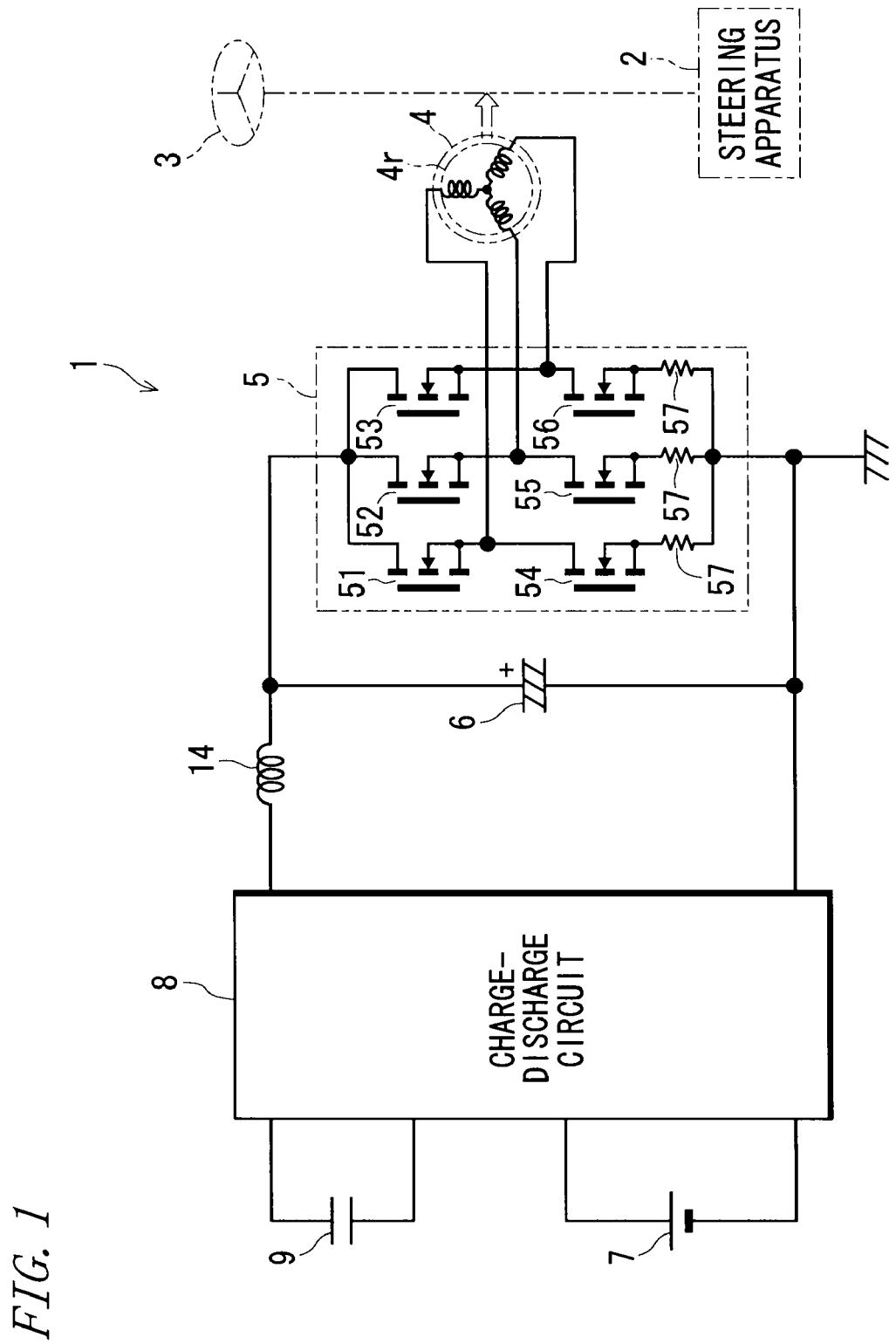
FIG. 1 is a circuit diagram schematically showing a general structure and principally showing electric circuitry of an electric power steering apparatus according to one embodiment of the present invention, or particularly showing a main circuit (except for control circuit) thereof.

FIG. 1 is a circuit diagram schematically showing a general structure and principally showing electric circuitry of an electric power steering apparatus 1 according to one embodiment of the present invention. FIG. 1 is the circuit diagram particularly showing a main circuit (except for control circuit). Referring to the figure, a steering device 2 is driven by a steering torque applied to a steering wheel 3 by a driver and a steering assist force generated by an electric motor 4. Reduction gears (not shown) are employed for power transmission from a rotor 4r of the motor 4 to the steering device 2. The motor 4 is a three-phase brushless motor that is driven by a motor driving circuit 5. The motor driving circuit 5 has a configuration wherein MOS-FETs 51 to 56 and resistors 57 constituting a three-phase bridge circuit are connected as shown in the figure. The motor driving circuit 5 is connected in parallel with a smoothing electrolytic capacitor 6. Electric power from a battery 7 is supplied to the motor driving circuit 5 via a charge-discharge circuit 8 and a reactor 14. An auxiliary power supply 9 is provided independently from the battery 7 and is connected to the charge-discharge circuit 8.

Figure 2:
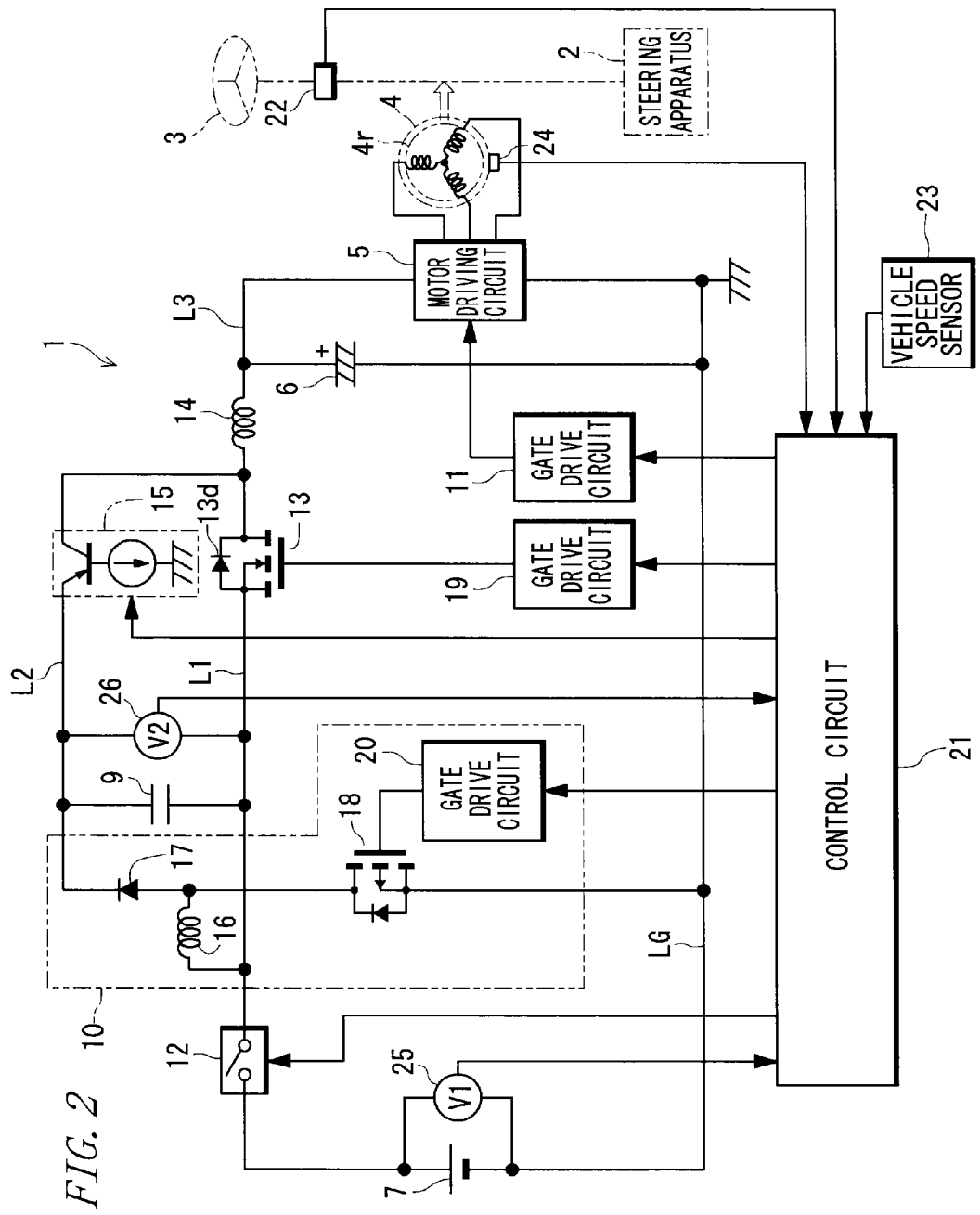
FIG. 2 is a circuit diagram showing, in addition to the components in FIG. 1, a specific configuration of a charge-discharge circuit, control circuit elements and circuit connections.

FIG. 2 is a circuit diagram showing, in addition to the components in FIG. 1, a specific configuration of the charge-discharge circuit 8, control circuit elements and circuit connections. Referring to the figure, the MOS-FETs 51 to 56 in the motor driving circuit 5 (FIG. 1) are switched by a gate drive circuit 11 (for example, FET driver, hereinafter referred to as the same). A voltage obtained by boosting a voltage of the battery 7 (or the auxiliary power supply 9) in a booster circuit (not shown) is applied to the gate drive circuit 11 and another gate drive circuit 19 to be described hereinlater.

The battery 7 serves as a main source for supplying the electric power to the motor driving circuit 5. The voltage of the battery 7 is conducted to an electrical conduction path L1 via a relay contact 12 as an on-off controllable switch and further to the motor driving circuit 5 and the motor 4 via an electrical conduction path L3 including a MOS-FET 13 and the reactor 14. The MOS-FET 13 is an N-channel device that is connected in a manner such that its source is located on a side of the battery 7 and its drain is located on a side of the motor driving circuit 5. A parasitic diode 13d is configured to pass current in the forward direction when the battery 7 supplies the electric power to the motor 4.

The auxiliary power supply 9 comprises an electric double-layer capacitor or lithium-ion battery and is connected in series with the battery 7. An electrical conduction path L2 on a high-potential side of the auxiliary power supply 9 is connected to a junction of a drain of the MOS-FET 13 and the reactor 14 via a discharge control circuit 15. An output voltage from the series-connected battery 7 and auxiliary power supply (voltage of the electrical conduction path L2) is conducted to the motor driving circuit 5 and the motor 4 via the conduction path L2 having the discharge control circuit 15 interposed therein and the conduction path L3 having the reactor 14 interposed therein.

On the other hand, the electrical conduction path L1 is connected with an anode of a diode 17 via a reactor 16. A cathode of the diode 17 is connected to the conduction path L2 on the high-potential side of the auxiliary power supply 9. A P-channel MOS-FET 18 for chopper-boosting is interposed between the anode of the diode 17 and an electrical conduction path to ground LG. Thus, it is possible to form a closed circuit extending from the battery 7 and through the relay contact 12, the reactor 16 and the MOS-FET 18. The closed circuit has a configuration wherein the relay contact 12 and the MOS-FET 18 as a switching device for chopper-boosting are interposed in an inductance circuit powered by the battery 7.

The MOS-FET 13 is on-off controlled by a gate drive circuit 19. The MOS-FET 18 is on-off controlled by a gate drive circuit 20.

The MOS-FET 13, discharge control circuit 15, reactor 16, diode 17, MOS-FET 18, gate drive circuit 19 and gate drive circuit 20 constitute the charge-discharge circuit 8 shown in FIG. 1. Also, the reactor 16, diode 17, MOS-FET 18 and gate drive circuit 20 constitute a charge circuit 10 for the auxiliary power supply 9.

The above-described gate drive circuits 11, 19, 20, the discharge control circuit 15 and the relay contact 12 operate in response to command signals from a control circuit 21 including a microcomputer. Inputted to the control circuit 21 is an output signal from a torque sensor 22 for detecting a steering torque applied to the steering wheel 3. Further, an output signal from a vehicle speed sensor 23 for detecting a vehicle speed is also inputted to the control circuit 21. The motor 4 is provided with an angle sensor 24 for detecting a rotational angular position of the rotor 4r. An output signal from the angle sensor is inputted to the control circuit 21.

The battery 7 and the auxiliary power supply 9 are connected in parallel with a voltage detector 25 and a voltage detector 26, respectively. The voltage detector 25 connected in parallel with the battery 7 detects a voltage V1 of the battery 7 while an output signal therefrom is inputted to the control circuit 21. The voltage detector 26 connected in parallel with the auxiliary power supply 9 detects a voltage V2 (terminal-to-terminal voltage) of the auxiliary power supply 9 while an output signal therefrom is inputted to the control circuit 21.

Based on a steering torque signal sent from the torque sensor 22, a vehicle speed signal sent from the vehicle speed sensor 23 and a rotor angular-position signal sent from the angle sensor 24, the control circuit 21 operates the motor driving circuit 5 via the gate drive circuit 11, thereby driving the motor 4 to generate a proper steering assist force.

The relay contact 12 is normally maintained in an on-state (closed) by the command signal from the control circuit 21. Therefore, the voltage from the battery 7 is applied to the conduction path L1.

On the other hand, when the MOS-FET 18 is on, the current from the battery 7 flows through the relay contact 12, the reactor 16 and the MOS-FET 18. If the MOS-FET 18 in this state is turned off, a reverse high-voltage is generated in the reactor 16 to thereby interfere with flux reversal caused by the current cutoff, and thereby the auxiliary power supply 9 is charged by a voltage obtained by boosting an output voltage of the battery 7 via the diode 17. Thus, the auxiliary power supply 9 can be charged by repeatedly turning on and off the MOS-FET 18. The control circuit 21 monitors the voltage V2 of the auxiliary power supply 9 such that if the voltage V2 is below a given value, the auxiliary power supply 9 is charged by turning on and off the MOS-FET 18 via the gate drive circuit 20. The charging operation is performed at the time when, for example, the torque sensor 22 is not detecting the steering torque.

Based on the steering torque and vehicle speed, the control circuit 21 estimates an electric power required for generating a required steering assist force and compares the estimated value with a reference value. In a case where the required electric power is equal to or less than the reference value, the control circuit 21 turns on the MOS-FET 13 and turns off the discharge control circuit 15 (first output mode of the charge-discharge circuit 8). Therefore, the voltage from the battery 7 is smoothed by the smoothing capacitor 16 and supplied to the motor driving circuit 5. The motor driving circuit 5 drives the motor 4 based on a control signal from the control circuit 21. In this case, the electric power is not supplied from the auxiliary power supply 9 to the motor driving circuit 5. It is noted that an on-resistance of the N-channel MOS-FET 13 (for example, approximately 1 mΩ) is much smaller than a forward resistance of the parasitic diode 13*d* and hence, the most of the current flowing from the battery 7 toward the motor driving circuit 5 passes through the source and drain thereof whereas a minor amount of current flows into the parasitic diode 13*d*.

On the other hand, in a case where the required electric power exceeds the reference value or where the battery 7 alone cannot provide the required electric power, the control circuit 21 turns off the MOS-FET 13 and turns on the discharge control circuit 15. Namely, a state where a predetermined current flows (second output mode of the charge-discharge circuit 8) is established. As a result, an output voltage from the battery 7 and the auxiliary power supply 9 connected in series with each other is supplied to the motor driving circuit 5. Thus, a high power over the maximum output power from the battery 7 alone can be supplied to the motor driving circuit 5. At this time, the cathode of the parasitic diode 13*d* of the MOS-FET 13 has higher potential than the anode thereof. Namely, the parasitic diode is subjected to the reverse voltage, thus preventing the auxiliary power supply 9 from producing the current flowing into the conduction path L1.

In this manner, the control is provided to select either the battery alone 7 or the combination of the battery 7 and the auxiliary power supply 9 in response to the required electric power.

Next, description is made on a circuit operation performed by the electric steering apparatus 1 in a case where the battery 7 suffers failure such as breakdown. First, the failure of the battery 7 is detected by the voltage detector 25 as an abnormal terminal voltage (drop). Receiving the detection signal, the control circuit 21 opens the relay contact 12 and keeps holding the MOS-FET 18 in the on-state by the gate drive circuit 20. Thus, one terminal (on the conduction path L1 side) of the auxiliary power supply 9 is connected to the conduction path to ground LG via the rector 16 and MOS-FET 18. Further, the control circuit 21 turns off the MOS-FET 13 and turns on the discharge control circuit 15. Hence, the voltage of the auxiliary power supply 9 is supplied to the motor driving circuit 5 via the discharge control circuit 15 and reactor 14 so that the driving electric power can be supplied to the motor 4. Even if the battery 7 fails, the auxiliary power supply 9 in turn can continue to supply the driving electric power to the motor 4.

During the failure of the battery 7, a control source voltage made from the voltage of the auxiliary power supply 9, for example, can be supplied to the control circuit 21 and other electronic components requiring the control source voltage.

The auxiliary power supply 9 may be used as the emergency power source, as described above, so that a time in which the steering assist is available can be extended at the time of failure of the battery 7. If the battery 7 should fail, therefore, the driver does not encounter a sudden cessation of steering assist and is allowed to have a sufficient time for pulling over or retracting the vehicle. When the battery 7 fails, the control circuit immediately gives the driver warning of the failure (warning lamp or sound).

As described above, when the failure of the battery 7 is detected, the electric power steering apparatus 1 keeps holding the MOS-FET 18 in the on-state to connect a first electrical conduction path (conduction path L1) to the conduction path to ground LG and drives the charge-discharge circuit 8 to select the second output mode, thereby supplying the electric power only from the auxiliary power supply 9 to the motor 4. This permits the auxiliary power supply 9 to be used not only for supplying the high power but also as the emergency power source. What is more, the MOS-FET 18 to permit the auxiliary power supply 9 to be used as the emergency power source is a circuit component for charging the auxiliary power supply 9. Therefore, the function of emergency power source can be imparted to the auxiliary power supply without adding a circuit component. Thus, it is possible to provide the electric power steering apparatus with not only the function of auxiliary power supply capable of meeting the high-power demand but also the function of emergency power source and minimizes the number of components.

When the battery 7 fails, the discharge of the battery 7 is disabled by opening the relay contact 12 so that the overdischarge of the failed battery 7 can be prevented.

It is noted that the MOS-FETs 13 and 18 according to the above embodiment are a mere illustrative example of the switching device and other switching devices may be used.

While the relay contact 12 of the above embodiment is the on-off controllable switch, this may be replaced by another switching device such as MOS-FET.

When determining whether or not the auxiliary power supply 9 is used for supplying the electric power to the motor 4, the control circuit 21 of the above embodiment takes the procedure of estimating the amount of electric power required for generating the required steering assist force, and comparing the estimated value with the reference value. However, the determination may be made by other methods. For instance, the current supplied to the motor driving circuit 5 is varied by the assist control in response to the required steering assist force, the assist control provided by the control circuit 21, gate drive circuit 11 and motor driving circuit 5. Therefore, the following method may be adopted. The voltage of the battery 7 and the current supplied to the motor driving circuit 5 are practically detected so as to determine the present input value by multiplying these detected values. If this present input value is equal to or less than the maximum power supplied by the battery 7 alone, the electric power is supplied by the battery 7 alone. If the present input value exceeds the maximum output of the battery, the electric power is supplied by the source consisting of the series-connected battery 7 and auxiliary power supply 9.

The invention claimed is:

1. An electric power steering apparatus for generating a steering assist force by a motor, comprising:
    a battery for supplying an electric power to the motor;
    an auxiliary power supply connected in series with the battery and capable of supplying an electric power to the motor;
    a detector for detecting a failure of the battery;
    a charge-discharge circuit including a charge circuit for charging the auxiliary power supply by turning on and off a voltage-boosting switching device interposed in an inductance circuit powered by the battery and selectively configuring a first output mode or a second output mode, the first output mode defining a state that the electric power is supplied to the motor by way of a first electrical conduction path through which a voltage of the battery is applied to an electrical conduction path to ground, the second output mode defining a state that the electric power is supplied to the motor by way of a second electrical conduction path through which a voltage of a source including the series-connected battery and auxiliary power supply is applied to the electrical conduction path to ground; and
    a control circuit for driving the charge-discharge circuit to select either of the first output mode and the second output mode in response to a required steering assist force, the control circuit connecting the first electrical conduction path to the electrical conduction path to ground by continuously holding the switching device in an on-state at the time of detection of a failure of the battery by the detector, the control circuit also driving the charge-discharge circuit to select the second output mode to thereby supply the motor with the electric power only from the auxiliary power supply.

2. The electric power steering apparatus according to claim 1, wherein an on-off controllable switch is interposed in a way from a terminal of the battery to the first electrical conduction path, and wherein the control circuit opens the switch when the failure of the battery is detected.

3. The electric power steering apparatus according to claim 2, wherein the switching device is one for chopper-boosting.

4. The electric power steering apparatus according to claim 1, wherein the switching device is one for chopper-boosting.

* * * * *